(12) United States Patent
Chen et al.

(10) Patent No.: US 9,467,961 B2
(45) Date of Patent: Oct. 11, 2016

(54) METHOD AND DEVICE FOR ESTABLISHING GS ASSOCIATION

(71) Applicant: Huawei Technologies Co., Ltd., Shenzhen, Guangdong (CN)

(72) Inventors: Zhongping Chen, Shenzhen (CN); Lin Shu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 14/263,235

(22) Filed: Apr. 28, 2014

(65) Prior Publication Data
US 2014/0235240 A1 Aug. 21, 2014

Related U.S. Application Data

(63) Continuation of application No. PCT/CN2011/081746, filed on Nov. 3, 2011.

(51) Int. Cl.
*H04W 60/00* (2009.01)
*H04W 76/04* (2009.01)
(Continued)

(52) U.S. Cl.
CPC ............. *H04W 60/00* (2013.01); *H04W 8/06* (2013.01); *H04W 60/005* (2013.01); *H04W 60/06* (2013.01); *H04W 76/045* (2013.01)

(58) Field of Classification Search
CPC ... H04W 60/00; H04W 8/06; H04W 60/005; H04W 60/06; H04W 76/045
See application file for complete search history.

(56) References Cited

U.S. PATENT DOCUMENTS

| | | |
|---|---|---|
| 2011/0177812 A1 | 7/2011 | Tanabe et al. |
| 2011/0206005 A1 | 8/2011 | Tanabe et al. |
| 2012/0157093 A1 | 6/2012 | Zhu et al. |

FOREIGN PATENT DOCUMENTS

| | | | | |
|---|---|---|---|---|
| CN | 101296518 A | * | 10/2008 | |
| CN | 101657024 A | | 2/2010 | |
| CN | 101657025 A | * | 2/2010 | .......... H04W 76/026 |

(Continued)

OTHER PUBLICATIONS

"LS on Security Considerations for Providing CSG ID Lists for Equivalent PLMNs," 3GPP TSG-SA WG2 Meeting #87, Jeju Island, Korea, TD S2-114717, 3$^{rd}$ Generation Partnership Project, Valbonne, France (Oct. 10-14, 2011).

(Continued)

*Primary Examiner* — Lester Kincaid
*Assistant Examiner* — William Wang
(74) *Attorney, Agent, or Firm* — Leydig, Voit & Mayer, Ltd.

(57) ABSTRACT

An embodiment of the present invention provides a method for establishing a Gs association, where the method includes: when a serving GPRS support node SGSN determines that an SGs association of a user equipment UE in an idle mode signaling reduction function ISR activated state is released, sending, by the SGSN, a location update request to a mobile switch center/visitor location register MSC/VLR, so that the SGSN and the MSC/VLR establish a Gs association for the UE. An embodiment of the present invention further provides an SGSN. In the embodiments of the present invention, when a UE is in an ISR activated state, and after an SGs association is released, a Gs association can be established in time, and therefore, the UE is not implicitly detached by an MSC/VLR, and a mobile terminated service of the UE is not affected, thereby enhancing service experience of a user.

17 Claims, 6 Drawing Sheets

The SGSN sends a location update request to a mobile switch center/visitor location register (MSC/VLR), so that the SGSN and the MSC/VLR establish a Gs association for the UE — 202

(51) Int. Cl.
*H04W 8/06* (2009.01)
*H04W 60/06* (2009.01)

(56) References Cited

FOREIGN PATENT DOCUMENTS

| CN | 101998590 A | 3/2011 |
|---|---|---|
| JP | 201010849 A | 1/2010 |
| JP | 201045551 A | 2/2010 |
| JP | 201093455 A | 4/2010 |
| WO | WO 2010020196 A1 | 2/2010 |
| WO | WO 2011022896 A1 | 3/2011 |

OTHER PUBLICATIONS

"Clarification About ISR Maintenance for CSFB," SA WG2 Meeting #87, Jeju Island, South Korea, S2-114192, 3rd Generation Partnership Project, Valbonne, France (Oct. 10-14, 2011).

"Inter-PLMN Handover to a CSG Cell Based on the Associated CSG White Lists," 3GPP TSG SA WG2 Meeting #87, Jeju Island, South Korea, S2-114101, 3rd Generation Partnership Project, Valbonne, France (Oct. 10-14, 2011).

"Suspend Clarification for CSFB," 3GPP TSG SA WG2 Meeting #80, Brustad, Norway, S2-104153, 3rd Generation Partnership Project, Valbonne, France (Aug. 30-Sep. 3, 2010).

"ISR Solutions for CS Fallback," 3GPP TSG SA WG2 Meeting #67, Sophia Antipolis, France, TD S2-086122, 3rd Generation Partnership Project, Valbonne, France (Aug. 25-29, 2008).

"Discussion About the Detach Procedure in CS Fallback and ISR Scenario," 3GPP TSG SA WG2 Meeting #67, Sophia Antipolis, S2-085558, 3rd Generation Partnership Project, Valbonne, France (Aug. 25-29, 2008).

"3rd Generation Partnership Project; Technical Specification Group Core Network and Terminals; Mobile radio interface Layer 3 specification; Core network protocols; Stage 3 (Release 9)," 3GPP TS 24.008, V9.8.0, pp. 1-615, 3rd Generation Partnership Project, Valbonne, France (Sep. 2011).

"3rd Generation Partnership Project; Technical Specification Group Core Network and Terminals; Non-Access-Stratum (NAS) protocol for Evolved Packet System (EPS); Stage 3 (Release 9)," 3GPP TS 24.301, V9.8.0, pp. 1-299, 3rd Generation Partnership Project, Valbonne, France (Sep. 2011).

"3rd Generation Partnership Project; Technical Specification Group Core Network and Terminals; Mobility Management Entity (MME)—Visitor Location Register (VLR) SGs interface specification (Release 10)," 3GPP TS 29.118, V10.5.0, pp. 1-61, 3rd Generation Partnership Project, Valbonne, France (Sep. 2011).

"3rd Generation Partnership Project; Technical Specification Group Services and System Aspects; Circuit Switched (CS) fallback in Evolved Packet System (EPS); Stage 2 (Release 10)," 3GPP TS 23.272, V10.5.0, pp. 1-79, 3rd Generation Partnership Project, Valbonne, France (Sep. 2011).

\* cited by examiner

METHOD AND DEVICE FOR ESTABLISHING GS ASSOCIATION

CROSS-REFERENCE TO RELATED APPLICATIONS

This application is a continuation of International Patent Application No. PCT/CN2011/081746, filed on Nov. 3, 2011, which is hereby incorporated by reference in its entirety.

FIELD OF THE INVENTION

The present invention relates to communications technologies, and in particular to a method and device for establishing a Gs association.

BACKGROUND OF THE INVENTION

A radio access network (Radio Access Network, hereinafter referred to as RAN) includes a GSM enhanced data rate for GSM evolution radio access network (GSM Enhanced Data Rate for GSM Evolution Radio Access Network, hereinafter referred to as GERAN), a universal mobile telecommunications system territorial radio access network (Universal Mobile Telecommunications System Territorial Radio Access Network, hereinafter referred to as UTRAN), and an evolved universal mobile telecommunications system territorial radio access network (Evolved UMTS Territorial Radio Access Network, hereinafter referred to as E-UTRAN).

A user equipment (User Equipment, hereinafter referred to as UE) first completes combined registration on the GERAN/UTRAN. The UE then moves to the E-UTRAN, completes combined update and activates an idle mode signaling reduction function (Idle mode signalling reduction, hereinafter referred to as ISR). When the UE moves to the GERAN/UTRAN again and camps on the GERAN/UTRAN, the UE may be implicitly detached by a mobile switch center/visitor location register (Mobile Switch Center/Visitor Location Register, hereinafter referred to as MSC/VLR).

The inventor finds that, in the prior art, when the foregoing scenario occurs, a UE under normal network coverage does not sense that the UE is implicitly detached by an MSC/VLR, which may cause that, after the UE is detached by the MSC/VLR, a mobile terminated service is unreachable, thereby affecting service experience of a user.

SUMMARY OF THE INVENTION

A summary of the present invention is given in the following, so as to provide basic understanding about some aspects of the present invention. It should be understood that, the summary is not an exhaustive summary about the present invention. It is not intended to determine a key part or an important part of the present invention, and is not intended to limit the scope of the present invention either. Its objective is only to give some concepts in a simple way, which is used as a preface of a more detailed description afterwards.

Embodiments of the present invention provide a method and device for establishing a Gs association.

A method for establishing a Gs association includes:

when a serving GPRS support node SGSN determines that an SGs association of a user equipment UE in an idle mode signaling reduction function ISR activated state is released, sending, by the SGSN, a location update request to a mobile switch center/visitor location register MSC/VLR, so that the SGSN and the MSC/VLR establish a Gs association for the UE.

A serving GPRS support node SGSN includes:

a determining unit, configured to determine that an SGs association of a user equipment UE in an idle mode signaling reduction function ISR activated state is released; and a sending unit, configured to: when the determining unit determines that the SGs association is released, send a location update request to a mobile switch center/visitor location register MSC/VLR, so that the SGSN and the MSC/VLR establish a Gs association for the UE.

It can be seen from the foregoing technical solutions that, with the method and device for establishing a Gs association provided in the embodiments of the present invention, a user equipment is in an ISR activated state, and after an SGs association is released, a Gs association can be established in time, so that the UE is not implicitly detached by an MSC/VLR, and a mobile terminated service of the UE is not affected, thereby enhancing service experience of a user.

BRIEF DESCRIPTION OF THE DRAWINGS

To describe the technical solutions in the embodiments of the present invention more clearly, the accompanying drawings required for describing the embodiments are briefly introduced in the following. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

Exemplary embodiments of the present invention are described in the following with reference to the accompanying drawings. For clarity and brevity, not all features of actual implementation manners are described in the specification. However, it should be noted that, many decisions specified to the implementation manners must be made during a process of developing any kind of actual embodiments, so as to realize specific objectives of the developer, and the these decision may be changed with different implementation manners.

Figures 1, 2:
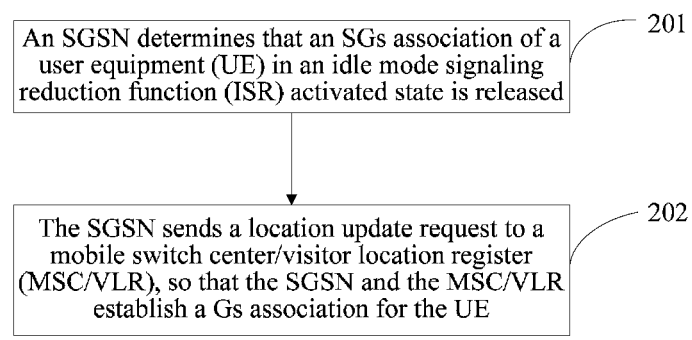
FIG. 1 is a structural diagram of a mobile communication network according to an embodiment of the present invention.
FIG. 2 is a schematic flow chart of a method according to a first embodiment of the present invention.
Figure 3:
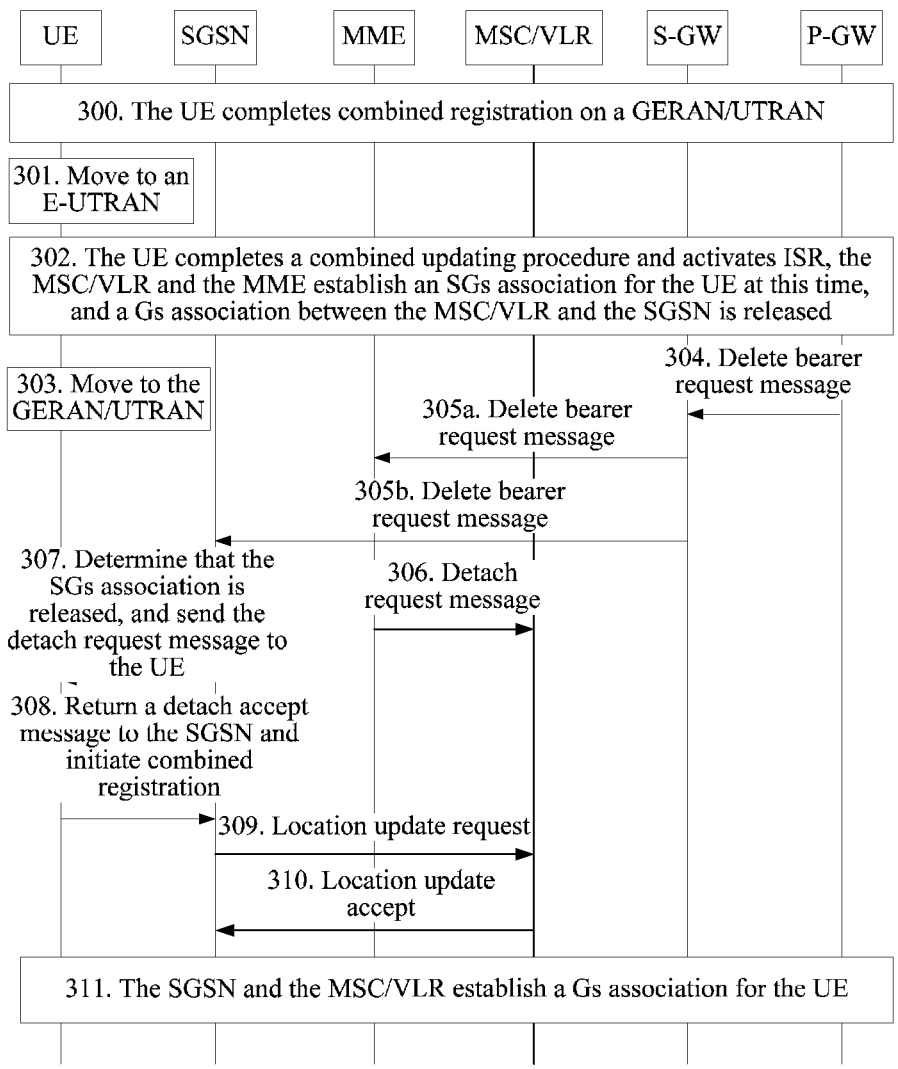
FIG. 3 is a schematic flow chart of a method according to a second embodiment of the present invention.

As shown in FIG. 1, a mobile communication network according to an embodiment of the present invention includes two parts: a radio access network (Radio Access Network, hereinafter referred to as RAN) and a core network (Core Network, hereinafter referred to as CN). A GERAN, a UTRAN and an E-UTRAN belong to the RAN. A mobility management entity (Mobility Management Entity, hereinafter referred to as MME), a serving GPRS support node (Serving GPRS Support Node, hereinafter referred to as SGSN), a mobile switch center/visitor location register (Mobile Switch Center/Visitor Location Register, hereinafter referred to as MSC/VLR), a serving gateway (Serving Gateway, hereinafter referred to as S-GW) and a packet data network gateway (Packet Data Network Gateway, hereinafter referred to as P-GW) belong to the CN. The CN is logically divided into a circuit switched (Circuit Switched, hereinafter referred to as CS) domain and a packet switched (Packet Switched, hereinafter referred to as PS) domain. The MSC/VLR is an entity in the CS domain, and the SGSN, the MME, the S-GW and the P-GW are entities in the PS domain.

In a mobile network, a UE in an idle mode needs to execute a corresponding mobility management procedure to change an access system. For example, when a UE in an idle mode accesses an E-UTRAN from a GERAN/UTRAN, the UE initiates a tracking area update (Tracking Area Update, hereinafter referred to as TAU) procedure; and when accessing a GERAN/UTRAN from an E-UTRAN, the UE initiates a routing area update (Routing Area Update, hereinafter referred to as RAU) procedure. In order to solve a problem that in an idle mode, a UE switches frequently between a GERAN/UTRAN and an E-UTRAN, causing a large number of the mobility management procedures, which results in a signaling storm, an idle mode signaling reduction function (Idle Mode Signaling Reduction, hereinafter referred to as ISR) is introduced in a network. An ISR is selected and activated by an SGSN or an MME and notified to a UE during a RAU procedure or a TAU procedure initiated by the UE. Once the ISR is activated, when the UE moves in a registered routing area (Routing Area, hereinafter referred to as RA) and a registered tracking area (Tracking Area, hereinafter referred to as TA), a RAU or TAU procedure does not occur due to a change of an access system.

A UE initiates a combined attach procedure (Combined Attach Procedure) or a combined tracking area/location area updating procedure (Combined TA/LA Updating Procedure) on an E-UTRAN, and the foregoing procedure is referred to as a combined procedure (Combined Procedure). An MME and an MSC/VLR establish an SGs association for the UE, and then the MME and the MSC/VLR record that the UE is in the SGs association. The MSC/VLR stops an implicit detach timer (Implicit Detach Timer), and the UE is not implicitly detached. The combined attach procedure may also be referred to as a combined registration procedure. The implicit detach timer is saved in the MSC/VLR. When the UE and the MSC/VLR are disconnected, the MSC/VLR starts the implicit detach timer, and if the implicit detach timer times out, the MSC/VLR detaches the UE. When the UE and the MSC/VLR establish a connection, the implicit detach timer is stopped and reset. Implicit detach means that a network side detaches a UE without notifying the UE. Explicit detach corresponding to the implicit detach means that a network side and a UE explicitly request detach, and notify each other through signaling.

Similarly, if the UE initiates a combined attach procedure (Combined Attach Procedure) or a combined tracking area/ location area updating procedure (Combined TA/LA Updating Procedure) on a GERAN/UTRAN, the foregoing procedure is referred to as a combined procedure (Combined Procedure). The combined attach procedure may also be referred to as a combined registration procedure. An SGSN and an MSC/VLR establish a Gs association for the UE, and the SGSN and the MSC/VLR record that the UE is in the SGs association, the MSC/VLR stops an implicit detach timer (Implicit Detach Timer), and the UE is not implicitly detached.

If the MSC/VLR and the SGSN have created the Gs association for the UE before the MME and the MSC/VLR create the SGs association for the UE, after the SGs association is established, the MSC/VLR records that the UE is in an SGs association state, and releases the Gs association between the MSC/VLR and the SGSN, and the MSC/VLR records that the Gs association is in a released state. Similarly, if the MSC/VLR and the MME have established the SGs association before the SGSN and the MSC/VLR create the Gs association for the UE, after the Gs association is established, the MSC/VLR records that the UE is in an Gs association state, and releases the SGs association, and the MSC/VLR records that the SGs association is in a released state.

The UE first completes a combined registration procedure on a GERAN/UTRAN, an SGSN and an MSC/VLR establish a Gs association for the UE. Therefore, the MSC/VLR does not start an implicit detach timer. At this time, the UE accesses an E-UTRAN, completes combined update, and activates ISR, and the Gs association is released at this time. The MSC/VLR and an MME establish an SGs association for the UE. Therefore, the MSC/VLR does not start the implicit detach timer either. In addition, the UE is in an ISR activated state, the UE in an idle mode moves in a registered RA area and a registered TA area, and a RAU or TAU procedure does not occur due to a change of an access network. In this case, the MME determines that a P-GW deletes a last packet data network (Packet Date Network, hereinafter referred to as PDN) connection and then deletes all bearer contexts, or an S-GW is restarted and all bearer contexts are released, and the MME sends a detach request message to the MSC/VLR, and releases the SGs association. The MSC/VLR starts the implicit detach timer. In addition, the MME needs to send the detach request message to the UE, if the UE camps on the GERAN/UTRAN at this time, the UE cannot receive the detach request message sent by the MME, and then an SGs association between the MME and the MSC/VLR cannot be re-established for the UE. When the UE is in the GERAN/UTRAN for a long time, the implicit detach timer saved by the MSC/VLR may time out, and therefore, the UE may be implicitly detached by the MSC/VLR, and a mobile terminated service is unreachable, thereby affecting service experience of a user.

In this scenario, an embodiment of the present invention provides a method and device for establishing a Gs association. Therefore, the UE is not implicitly detached by the MSC/VLR, and a problem that the mobile terminated service is unreachable is solved.

A first embodiment of the present invention provides a method for establishing a Gs association, and as shown in FIG. 2, the method includes:

Step 201: A serving GPRS support node SGSN determines that an SGs association of a user equipment UE in an idle mode signaling reduction function ISR activated state is released.

Optionally, when the SGSN receives a delete bearer request message from a serving gateway S-GW or determines that the S-GW is restarted, it is determined that the SGs association is released, which specifically includes: The SGSN determines that all bearer contexts are released and the UE in an ISR activated state has an evolved packet system mobility management combined procedure EMM Combined Procedure capability, that is, determines that the SGs association is released.

Optionally, when the SGSN receives a detach notification message from a mobility management entity MME, it is determines that the SGs association is released, which specifically includes: The SGSN determines that the UE in an ISR activated state has an evolved packet system mobility management combined procedure EMM Combined Procedure capability, that is, determines that the SGs association is released.

Specifically, when the MME receives a delete bearer request sent by the serving gateway S-GW and releases the SGs association, or when the MME determines that the S-GW is restarted and the SGs association is released, the SGSN receives the detach notification message from the MME.

Optionally, the detach notification message received from the MME further includes: carried information indicating that the SGs association is released.

Further, optionally, information that the UE has an EMM Combined Procedure capability is provided by the UE for the SGSN when the UE initiates attach or routing area update on a GSM enhanced data rate for GSM evolution radio access network/evolved universal mobile telecommunications system territorial radio access network GERAN/UTRAN.

Step 202: The SGSN sends a location update request to a mobile switch center/visitor location register MSC/VLR, so that the SGSN and the MSC/VLR establish a Gs association for the UE.

Optionally, before the SGSN sends the location update request to the MSC/VLR, the method further includes:

sending, by the SGSN, a detach request message to the UE, so that the UE initiates a combined registration procedure.

Optionally, a type indication of the detach request message sent by the SGSN to the UE is international mobile subscriber identity detachment, so that the UE initiates the combined registration procedure.

Optionally, when the UE is in an idle state, before sending the detach request message to the UE, the SGSN sends a paging message to the UE, so that the state of the UE switches to a connected state, and the UE can receive the detach request message sent by the SGSN.

With the method for establishing a Gs association provided in the first embodiment of the present invention, when a UE is in an ISR activated state, and after an SGs association is released, a Gs association can be established for the UE in time, and therefore, the UE is not implicitly detached by an MSC/VLR, and a mobile terminated service of the UE is not affected, thereby enhancing service experience of a user.

A second embodiment of the present invention provides a method for establishing a Gs association, and specific steps include:

Step 300: A UE completes a combined registration procedure on a GERAN/UTRAN.

The UE sends an attach request (Attach Request) message to an SGSN, where a cell attach type (Attach Type) carried in the message is set to combined attach (Combined Attach). Because the attach is combined attach, the SGSN sends a location update request to an MSC/VLR, the MSC/VLR returns a location update accept, and the SGSN and the MSC/VLR establish a Gs association for the UE. At this time, the MSC/VLR does not start an implicit detach timer. The SGSN returns an attach accept (Attach Accept) message to the UE, and the combined attach is completed. The SGSN obtains information that the UE has an EMM Combined Procedure capability. The SGSN may also obtain the information that the UE has an EMM Combined Procedure capability, when a UE routing area is updated.

Step 301: The UE moves to an E-UTRAN.

Step 302: The UE completes a combined updating procedure and activates ISR.

The UE sends a TAU Request message to an MME, where a cell Update Type carried in the message is set to Combined TA/LA Updating. Because it is a combined updating procedure, the MME sends a location update request to the MSC/VLR, the MSC/VLR returns a location update accept to the MME, the MSC/VLR and the MME establish an SGs association for the UE, the Gs association between the SGSN and the MSC/VLR in step 300 is released, and the MSC/VLR does not start the implicit detach timer. The MME returns a TAU Accept message to the UE, where the message carries cell ISR Activated, which is used to notify the UE of activating the ISR, thereby completing the combined updating procedure.

Step 303: The UE moves to the GERAN/UTRAN and camps on the GERAN/UTRAN.

Step 304: A P-GW initiates a last PDN connection release procedure, so as to delete all bearer contexts. At this time, the P-GW sends a delete bearer request message to an S-GW. In this embodiment, the delete bearer request message sent by the P-GW to the S-GW specifically is a Delete Bearer Request message.

Steps 305a and 305b: In an ISR activated scenario, the S-GW saves information of the SGSN and the MME, which serve the UE, at the same time. Therefore, after receiving the Delete Bearer Request message sent by the P-GW in step 304, the S-GW may send a delete bearer request message to the MME and the SGSN. In this embodiment, the delete bearer request message sent by the S-GW is a Delete Bearer Request message, in step 305a, the MME is notified that a last PDN connection is released, and in step 305b, the SGSN is notified that the last PDN connection is released, that is, all the bearer contexts are released.

There is no time sequence between steps 305a and 305b.

Step 306: After receiving the Delete Bearer Request message sent by the S-GW in step 305a, the MME determines that the last PDN connection is released, and the MME sends a detach request message to the MSC/VLR, where the detach request message may be SGsAP-EPS-DETACH-INDICATION, so that the MSC/VLR releases the SGs association, and starts the implicit detach timer.

Step 307: If the SGSN receives the delete bearer request message sent by the S-GW, where the message specifically is a Delete Bearer Request message in this embodiment, the SGSN determines that all the bearer contexts are deleted and the UE in an ISR activated state has an EMM Combined Procedure capability, that is, determines that the SGs association is released, and sends a detach request message to the UE. Optionally, a type indication of the detach request message is international mobile subscriber identity detachment, so that the UE initiates a combined registration procedure. In this embodiment, the detach request message is a Detach Request message. If the UE is in an idle state, before executing this step, the SGSN sends a paging message to the UE first, and after receiving the paging message, the UE returns a packet data unit PDU or a service request Service Request message to the SGSN, so that the UE switches from the idle state to a connected state, and then the UE may receive the detach request message sent by the SGSN.

Step 308: After receiving the detach request message, the UE returns a detach accept message to the SGSN and the UE initiates combined registration. In this embodiment, the detach accept message returned by the UE is a Detach Response message.

Step 309: The SGSN sends a location update request to the MSC/VLR. In this embodiment, the location update request is a Location Update Request.

Step 310: The MSC/VLR returns a location update accept to the SGSN. In this embodiment, the location update accept returned by the MSC/VLR to the SGSN is a Location Update Ack.

Step 311: The SGSN and the MSC/VLR establish a Gs association for the UE.

For step 304 in the second embodiment of the present invention, that is, in the case that the P-GW deletes the last PDN connection and then all the bearer contexts are released, subsequent steps are triggered. In another embodiment of the present invention, after step 303, for a scenario where the S-GW is restarted, when the SGSN determines that the S-GW is restarted, the SGSN determines that all the bearer contexts are deleted and the UE in an ISR activated state has an EMM Combined Procedure capability, that is, determines that the SGs association is released, and a detach request message is sent to the UE. Optionally, a type indication of the detach request message is international mobile subscriber identity detachment, so that the UE initiates a combined registration procedure. In this embodiment, the detach request message is a Detach Request message. If the UE is in an idle state, before executing this step, the SGSN sends a paging message to the UE first, and after receiving the paging message, the UE returns a packet data unit PDU or a service request Service Request message to the SGSN, so that the UE switches from the idle state to a connected state, and then the UE may receive the detach request message sent by the SGSN. Subsequent steps are similar to steps 308, 309, 310 and 311 in the second embodiment, which are not described again.

In this embodiment of the present invention, after the SGs association between the MME and the MSC/VLR is released in the foregoing scenario, a Gs association between the SGSN and the MSC/VLR is established accurately for the UE in time, thereby effectively solving problems that the MSC/VLR starts an implicit detach timer to implicitly detach the UE and a mobile terminated service is unreachable.

Figure 4:
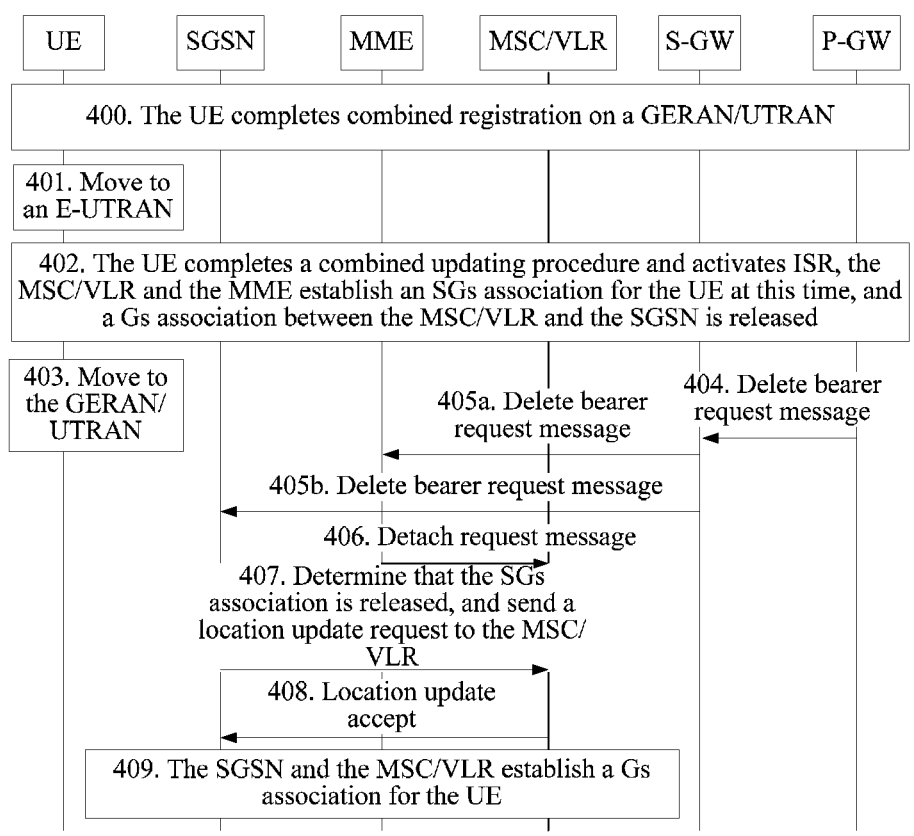
FIG. 4 is a schematic flow chart of a method according to a third embodiment of the present invention.

A third embodiment of the present invention provides a method for establishing a Gs association, and as shown in FIG. 4, specific steps include:

Step 400: A UE completes a combined registration procedure on a GERAN/UTRAN.

The UE sends an attach request (Attach Request) message to an SGSN, where a cell attach type (Attach Type) carried in the message is set to combined attach (Combined Attach). Because the attach is combined attach, the SGSN sends a location update request to an MSC/VLR, the MSC/VLR returns a location update accept, and the SGSN and the MSC/VLR establish a Gs association for the UE. At this time, the MSC/VLR does not start an implicit detach timer. The SGSN returns an attach accept (Attach Accept) message to the UE, and the combined attach is completed. The SGSN obtains information that the UE has an EMM Combined Procedure capability. The SGSN may also obtain the information that the UE has an EMM Combined Procedure capability, when a UE routing area is updated.

Step 401: The UE moves to an E-UTRAN.

Step 402: The UE completes a combined updating procedure and activates ISR.

The UE sends a TAU Request message to an MME, where a cell Update Type carried in the message is set to Combined TA/LA Updating. Because it is a combined updating procedure, the MME sends a location update request to the MSC/VLR, the MSC/VLR returns a location update accept to the MME, the MSC/VLR and the MME establish an SGs association for the UE, the Gs association between the SGSN and the MSC/VLR in step 400 is released, and the MSC/VLR does not start the implicit detach timer. The MME returns a TAU Accept message to the UE, where the message carries cell ISR Activated, which is used to notify the UE of activating the ISR, thereby completing the combined updating procedure.

Step 403: The UE moves to the GERAN/UTRAN and camps on the GERAN/UTRAN.

Step 404: A P-GW initiates a last PDN connection release procedure, so as to delete all bearer contexts. At this time, the P-GW sends a delete bearer request message to an S-GW. In this embodiment, the delete bearer request message sent by the P-GW to the S-GW specifically is a Delete Bearer Request message.

Steps 405a and 405b: In an ISR activated scenario, the S-GW saves information of the SGSN and the MME, which serve the UE, at the same time. Therefore, after receiving the Delete Bearer Request message sent by the P-GW in step 404, the S-GW may send a delete bearer request message to the MME and the SGSN. In this embodiment, the delete bearer request message sent by the S-GW is a Delete Bearer Request message, in step 405a, the MME is notified that a last PDN connection is released, and in step 405b, the SGSN is notified that the last PDN connection is released, that is, all the bearer contexts are released.

There is no time sequence between steps 405a and 405b.

Step 406: After receiving the Delete Bearer Request message sent by the S-GW in step 405a, the MME determines that the last PDN connection is released, and the MME sends a detach request message to the MSC/VLR, where the detach request message may be SGsAP-EPS-DETACH-INDICATION, so that the MSC/VLR releases the SGs association, and starts the implicit detach timer.

Step 407: The SGSN receives the delete bearer request message sent by the S-GW, where the message specifically is a Delete Bearer Request message in this embodiment, the SGSN determines that all the bearer contexts are deleted and the UE in an ISR activated state has an EMM Combined Procedure capability, that is, determines that the SGs association is released, and the SGSN sends a location update request to the MSC/VLR. In this embodiment, the location update request is a Location Update Request.

Step 408: The MSC/VLR returns a location update accept to the SGSN. In this embodiment, the location update accept returned by the MSC/VLR to the SGSN is a Location Update Ack.

Step 409: The SGSN and the MSC/VLR establish a Gs association for the UE.

For step 404 in the third embodiment of the present invention, that is, in the case that the P-GW deletes the last PDN connection and then all the bearer contexts are released, subsequent steps are triggered. In another embodiment of the present invention, after step 403, for a scenario where the S-GW is restarted, when the SGSN determines that the S-GW is restarted, the SGSN determines that all the bearer contexts are deleted and the UE in an ISR activated state has an EMM Combined Procedure capability, that is, determines that the SGs association is released, and a location update request is sent to the MSC/VLR. Subsequent steps are similar to steps 408 and 409 in the third embodiment, which are not described again.

In this embodiment of the present invention, after the SGs association between the MME and the MSC/VLR is released in the foregoing scenario, a network side establishes a Gs association between the SGSN and the MSC/VLR for the UE in time, thereby reducing a signaling interaction procedure, and effectively solving problems that the MSC/VLR starts an implicit detach timer to implicitly detach the UE and then a mobile terminated service is unreachable.

Figure 5:
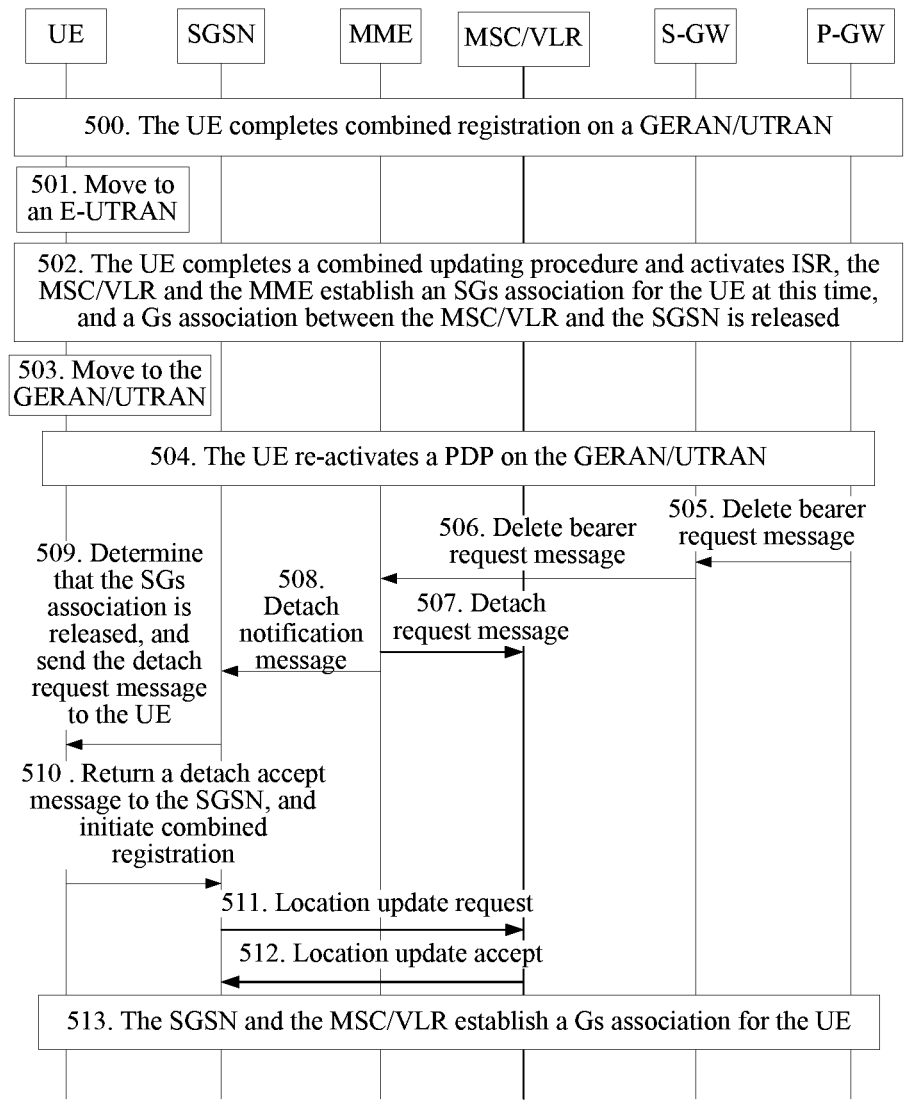
FIG. 5 is a schematic flow chart of a method according to a fourth embodiment of the present invention.

A fourth embodiment of the present invention provides a method for establishing a Gs association, and as shown in FIG. 5, specific steps include:

Step 500: A UE completes a combined registration procedure on a GERAN/UTRAN.

The UE sends an attach request (Attach Request) message to an SGSN, where a cell attach type (Attach Type) carried in the message is set to combined attach (Combined Attach). Because the attach is combined attach, the SGSN sends a location update request to an MSC/VLR, the MSC/VLR returns a location update accept, and the SGSN and the MSC/VLR establish a Gs association for the UE. At this time, the MSC/VLR does not start an implicit detach timer. The SGSN returns an attach accept (Attach Accept) message to the UE, and the combined attach is completed. The SGSN obtains information that the UE has an EMM Combined Procedure capability. The SGSN may also obtain the information that the UE has an EMM Combined Procedure capability, when a UE routing area is updated.

Step 501: The UE moves to an E-UTRAN.

Step 502: The UE completes a combined updating procedure and activates ISR.

The UE sends a TAU Request message to an MME, where a cell Update Type carried in the message is set to Combined TA/LA Updating. Because it is a combined updating procedure, the MME sends a location update request to the MSC/VLR, the MSC/VLR returns a location update accept to the MME, the MSC/VLR and the MME establish an SGs association for the UE, the Gs association between the SGSN and the MSC/VLR in step 500 is released, and the MSC/VLR does not start the implicit detach timer. The MME returns a TAU Accept message to the UE, where the message carries cell ISR Activated, which is used to notify the UE of activating the ISR, thereby completing the combined updating procedure.

Step 503: The UE moves to the GERAN/UTRAN and camps on the GERAN/UTRAN.

Step 504: The UE re-activates a packet data protocol (Packet Data Protocol, hereinafter referred to as PDP) on the GERAN/UTRAN.

Step 505: A P-GW initiates a PDN connection release procedure, the P-GW sends a delete bearer request message to an S-GW. In this embodiment, the delete bearer request message sent by the P-GW to the S-GW is a Delete Bearer Request message.

Step 506: In an ISR activated scenario, the S-GW saves information of the MME that serves the UE. Therefore, after the S-GW receives the Delete Bearer Request message sent by the P-GW in step 505, the S-GW may send a delete bearer request message to the MME. In this embodiment, the delete bearer request message sent by the S-GW is a Delete Bearer Request message, to notify the MME that a last PDN connection is released.

Step 507: After receiving the Delete Bearer Request message sent by the S-GW in step 506, the MME determines that the last PDN connection is released, and the MME sends a detach request message to the MSC/VLR, where the detach request message may be SGsAP-EPS-DETACH-INDICATION, so that the MSC/VLR releases the SGs association, and starts the implicit detach timer.

Step 508: The MME sends a detach notification message to the SGSN, to notify the SGSN that the SGs association is released, where the detach notification message may further carry information used to indicate that the SGs association is released, that is, the SGs association switches from an associated state to a released state. In this embodiment, the detach notification message sent by the MME to the SGSN is a Detach Notification.

Step 509: After the SGSN receives the detach notification message sent by the MME, that is, the Detach Notification in this embodiment, the SGSN determines that the UE in an ISR activated state has an evolved packet system mobility management combined procedure EMM Combined Procedure capability, that is, determines that the SGs association is released. The SGSN sends a detach request message to the UE, where a type indication of the detach request message may be international mobile subscriber identity detachment, so that the UE initiates a combined registration procedure. In this embodiment, the detach request message sent by the SGSN to the UE specifically is a Detach Request message. If the UE is in an idle state, before executing this step, the SGSN sends a paging message to the UE first, and after receiving the paging message, the UE returns a packet data unit PDU or a service request Service Request message to the SGSN, so that the UE switches from the idle state to a connected state, and then the UE may receive the Detach Request message sent by the SGSN.

Step 510: After the UE receives the Detach Request message, the UE returns a detach accept message to the SGSN, and initiates combined registration. The detach accept message returned by the UE in this embodiment specifically is a Detach Response message.

Step 511: The SGSN sends a location update request to the MSC/VLR. In this embodiment, the location update request specifically may be a Location Update Request.

Step 512: The MSC/VLR returns a location update accept to the SGSN. In this embodiment, the location update accept returned by the MSC/VLR to the SGSN is a Location Update Ack.

Step 513: The SGSN and the MSC/VLR establish a Gs association for the UE.

For step 505 in the fourth embodiment of the present invention, that is, the P-GW initiates a PDN connection release procedure, subsequent steps are triggered. In another embodiment of the present invention, after step 504, for a scenario where the S-GW is restarted, when the MME determines that the S-GW is restarted, the MME sends a detach request message to the MSC/VLR, where the detach request message may be SGsAP-EPS-DETACH-INDICATION, so that the MSC/VLR releases the SGs association, and starts the implicit detach timer. Subsequent steps are similar to steps 508, 509, 510, 511 and 512 in the fourth embodiment, which are not described again.

In this embodiment of the present invention, after the SGs association between the MME and the MSC/VLR is released in the foregoing scenario, in the case that SGSN and MME bearers are not synchronous, a Gs association between the SGSN and the MSC/VLR is established accurately for the UE in time, thereby effectively solving problems that the MSC/VLR starts an implicit detach timer to implicitly detach the UE, and a mobile terminated service is unreachable.

Figure 6:
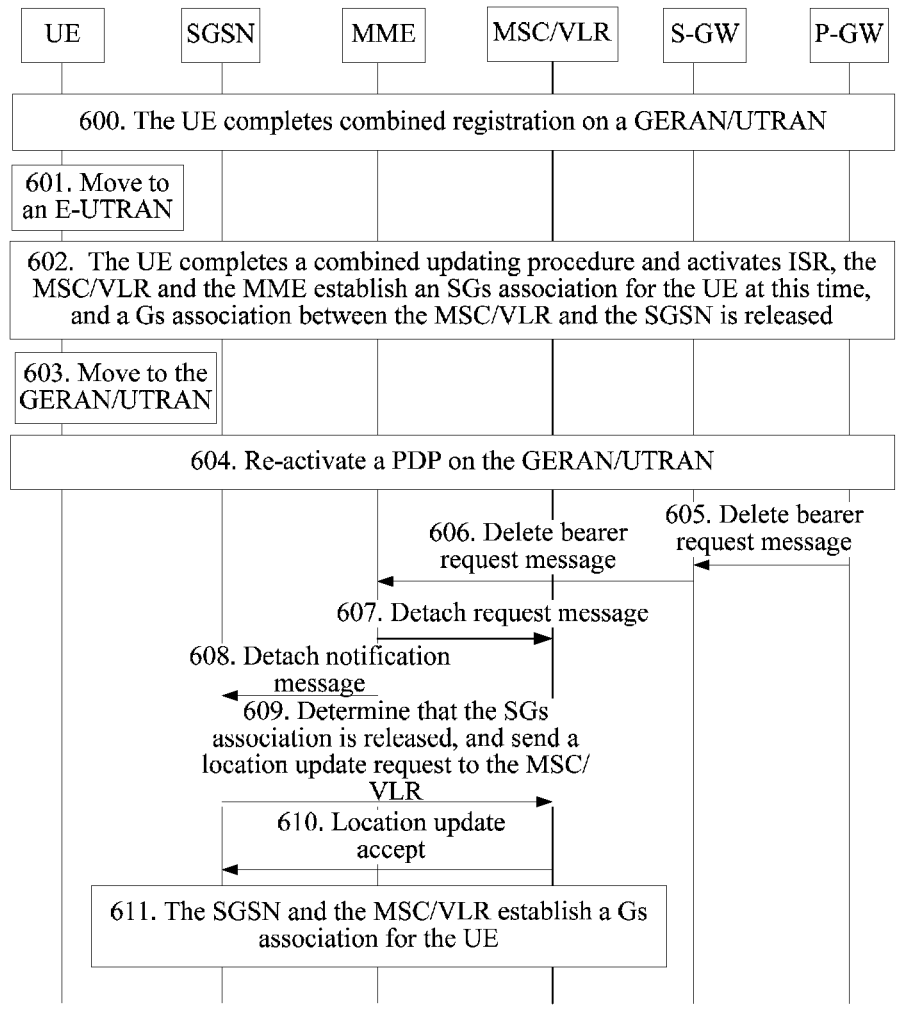
FIG. 6 is a schematic flow chart of a method according to a fifth embodiment of the present invention.

A fifth embodiment of the present invention provides a method for establishing a Gs association, and as shown in FIG. 6, specific steps include:

Step 600: A UE completes a combined registration procedure on a GERAN/UTRAN.

The UE sends an attach request (Attach Request) message to an SGSN, where a cell attach type (Attach Type) carried in the message is set to combined attach (Combined Attach). Because the attach is combined attach, the SGSN sends a location update request to an MSC/VLR, the MSC/VLR returns a location update accept, and the SGSN and the MSC/VLR establish a Gs association for the UE. At this time, the MSC/VLR does not start an implicit detach timer. The SGSN returns an attach accept (Attach Accept) message to the UE, and the combined attach is completed. The SGSN obtains information that the UE has an EMM Combined Procedure capability. The SGSN may also obtain the information that the UE has an EMM Combined Procedure capability, when a UE routing area is updated.

Step 601: The UE moves to an E-UTRAN.

Step 602: The UE completes a combined updating procedure and activates ISR.

The UE sends a TAU Request message to an MME, where a cell Update Type carried in the message is set to Combined TA/LA Updating. Because it is a combined updating procedure, the MME sends a location update request to the MSC/VLR, the MSC/VLR returns a location update accept to the MME, the MSC/VLR and the MME establish an SGs association for the UE, the Gs association between the SGSN and the MSC/VLR in step 600 is released, and the MSC/VLR does not start the implicit detach timer. The MME returns a TAU Accept message to the UE, where the message carries cell ISR Activated, which is used to notify the UE of activating the ISR, thereby completing the combined updating procedure.

Step 603: The UE moves to the GERAN/UTRAN and camps on the GERAN/UTRAN.

Step 604: The UE re-activates a PDP on the GERAN/UTRAN.

Step 605: A P-GW initiates a PDN connection release procedure, the P-GW sends a delete bearer request message to an S-GW. In this embodiment, the delete bearer request message sent by the P-GW to the S-GW is a Delete Bearer Request message.

Step 606: In an ISR activated scenario, the S-GW saves information of the MME that serves the UE. Therefore, after the S-GW receives the Delete Bearer Request message sent by the P-GW in step 605, the S-GW may send a delete bearer request message to the MME. In this embodiment, the delete bearer request message sent by the S-GW is a Delete Bearer Request message, to notify the MME that a last PDN connection is released.

Step 607: After receiving the Delete Bearer Request message sent by the S-GW in step 606, the MME determines that the last PDN connection is released, and the MME sends a detach request message to the MSC/VLR, where the detach request message may be SGsAP-EPS-DETACH-INDICATION, so that the MSC/VLR releases the SGs association, and starts the implicit detach timer.

Step 608: The MME sends a detach notification message to the SGSN, to notify the SGSN that the SGs association is released, where the detach notification message may further carry information used to indicate that the SGs association is released, that is, the SGs association switches from an associated state to a released state. In this embodiment, the detach notification message sent by the MME to the SGSN is a Detach Notification.

Step 609: After the SGSN receives the detach notification message sent by the MME, where the detach notification message in this embodiment specifically is a Detach Notification, the SGSN determines that the UE in an ISR activated state has an evolved packet system mobility management combined procedure EMM Combined Procedure capability, that is, determines that the SGs association is released. The SGSN sends a location update request to the MSC/VLR. In this embodiment, the location update request specifically may be a Location Update Request.

Step 610: The MSC/VLR returns a location update accept to the SGSN. In this embodiment, the location update accept returned by the MSC/VLR to the SGSN is a Location Update Ack.

Step 611: The SGSN and the MSC/VLR establish a Gs association for the UE.

For step 605 in the fifth embodiment of the present invention, that is, the P-GW initiates a PDN connection release procedure, subsequent steps are triggered. In another embodiment of the present invention, after step 604, for a scenario where the S-GW is restarted, when the MME determines that the S-GW is restarted, the MME sends a detach request message to the MSC/VLR, where the detach request message may be SGsAP-EPS-DETACH-INDICATION, so that the MSC/VLR releases the SGs association, and starts the implicit detach timer. Subsequent steps are similar to steps 608, 609, 610 and 611 in the fifth embodiment, which are not described again.

In this embodiment of the present invention, after the SGs association between the MME and the MSC/VLR is released in the foregoing scenario, in the case that SGSN and MME bearers are not synchronous, a network side establishes a Gs association between the SGSN and the MSC/VLR for the UE in time, thereby reducing a signaling interaction procedure, and effectively solving problems that the MSC/VLR starts an implicit detach timer to implicitly detach the UE and then a mobile terminated service is unreachable.

Figure 7:
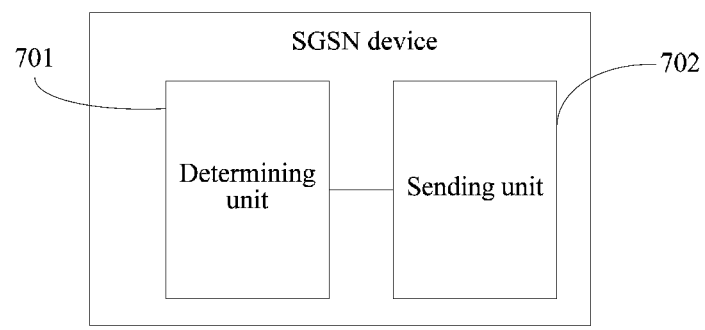
FIG. 7 is a schematic structural diagram of an SGSN according to a sixth embodiment of the present invention.

A sixth embodiment of the present invention provides an SGSN device. As shown in FIG. 7, a specific structure includes a determining unit 701 and a sending unit 702. The determining unit 701 is configured to determine that an SGs association of a user equipment UE in an idle mode signaling reduction function ISR activated state is released; and the sending unit 702 is configured to: when the determining unit determines that the SGs association is released, send a location update request to a mobile switch center/visitor location register MSC/VLR, so that the SGSN and the MSC/VLR establish a Gs association for the UE.

Before sending the location update request to the MSC/VLR, the sending unit 702 may further be configured to send a detach request message to the UE, so that the UE initiates a combined registration procedure. A type indication of the detach request message sent by the sending unit 702 may be international mobile subscriber identity detachment, so that the UE that receives the detach request message initiates the combined registration procedure.

If the UE is in an idle state, before sending the detach request message to the UE, the sending unit 702 is further configured to send a paging message to the UE, and after receiving the paging message sent by the sending unit 702, the UE returns a packet data unit PDU or a service request Service Request message to the SGSN, so that the UE switches from the idle state to a connected state, and then the UE can receive the detach request message sent by the SGSN.

Before sending the location update request to the MSC/VLR, the sending unit 702 is configured to send the detach request message to the UE, if the UE is in the idle state, the sending unit 702 is configured to send the paging message to the UE before sending the detach request message to the UE, which are both optional functions of the device.

With the SGSN device provided in this embodiment, when a UE is in an ISR activated state, and after an SGs association is released, a Gs association can be established for the UE in time, and therefore, the UE is not implicitly detached by an MSC/VLR, and a mobile terminated service of the UE is not affected, thereby enhancing service experience of a user.

Figure 8:
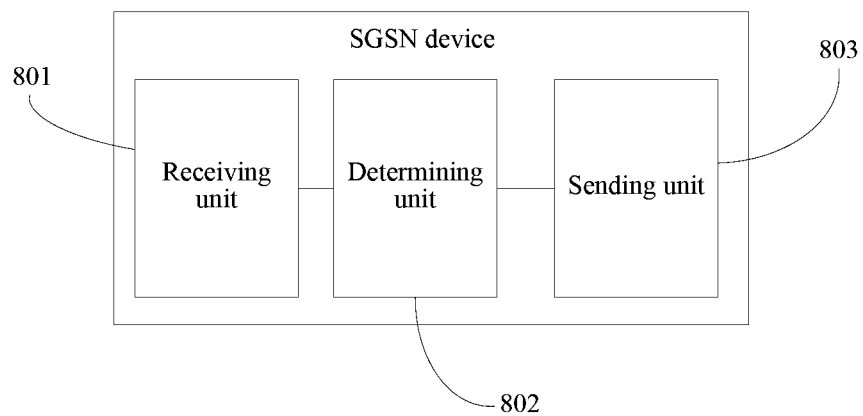
FIG. 8 is a schematic structural diagram of an SGSN according to a seventh embodiment of the present invention.

A seventh embodiment of the present invention provides an SGSN device. As shown in FIG. 8, a specific structure includes a receiving unit 801, a determining unit 802, and a sending unit 803.

The receiving unit 801 is configured to receive a delete bearer request message from a serving gateway S-GW, or determine that a serving gateway S-GW is restarted, or receive a detach notification message from a mobility management entity MME.

The determining unit 802 is configured to determine that an SGs association of a user equipment UE in an idle mode signaling reduction function ISR activated state is released.

The sending unit 803 is configured to: when the determining unit determines that the SGs association is released, send a location update request to an MSC/VLR, so that the MSC/VLR and the SGSN establish a Gs association for the UE.

In addition, the receiving unit 801 is further configured to receive information of an EMM Combined Procedure capability that is sent by the UE to the SGSN when the UE initiates combined attach or routing area update on a GSM enhanced data rate for GSM evolution radio access network/evolved universal mobile telecommunications system territorial radio access network GERAN/UTRAN.

When the receiving unit 801 receives the delete bearer request from the S-GW, or determines that the S-GW is restarted, the determining unit 802 is specifically configured to determine that all bearer contexts are released and the UE in an ISR activated state has an evolved packet system mobility management combined procedure EMM Combined Procedure capability, that is, determine that the SGs association is released.

When the receiving unit 801 receives the detach notification message from the MME, the determining unit 802 is specifically configured to determine that the UE in an ISR activated state has an evolved packet system mobility management combined procedure EMM Combined Procedure capability, that is, determine that the SGs association is released.

Before sending the location update request to the MSC/VLR, the sending unit 803 may further be configured to send a detach request message to the UE, so that the UE initiates a combined registration procedure. A type indication of the detach request message sent by the sending unit 803 is international mobile subscriber identity detachment, so that the UE that receives the detach request message initiates the combined registration procedure.

If the UE is in an idle state, before sending the detach request message to the UE, the sending unit 803 is further configured to send a paging message to the UE, and after receiving the paging message sent by the sending unit 803, the UE returns a packet data unit PDU or a service request Service Request message to the SGSN, so that the UE switches from the idle state to a connected state, and then the UE can receive the detach request message sent by the SGSN.

Before sending the location update request to the MSC/VLR, the sending unit 803 is configured to send the detach request message to the UE, and if the UE is in the idle state, the sending unit 803 is configured to send the paging message to the UE before sending the detach request message to the UE, so that the UE switches to the connected state, which are both optional functions of the device.

With the SGSN device provided in this embodiment, when a UE is in an ISR activated state, after an SGs association is released, a Gs association can be established for the UE in time, and therefore, the UE is not implicitly detached by an MSC/VLR, and a mobile terminated service of the UE is not affected, thereby enhancing service experience of a user.

Persons of ordinary skill in the art may be aware that, in combination with the examples described in the embodiments disclosed in this specification, units and algorithm steps may be implemented by electronic hardware, computer software, or a combination of the two. To clearly describe interchangeability between hardware and software, compositions and steps of each example has generally been described according to functions in the foregoing description. Whether these functions are executed in a manner of hardware or software depends on particular applications and design constraint conditions of the technical solutions. Persons skilled in the art may use different methods to implement the described functions for each particular application, but it should not be considered that such implementation goes beyond the scope of the present invention.

It may be clearly understood by persons skilled in the art that, for the purpose of convenient and brief description, for a detailed working process of the foregoing described system, apparatus, and unit, reference may be made to a corresponding process in the method embodiments, which is not described herein again.

In several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not be performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of the present invention may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to execute all or a part of steps of the methods described in the embodiments of the present invention. The storage medium includes: any medium that can store program codes, such as a U-disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A method for establishing a Gs association, comprising:
determining, by a serving General Packet Radio Service (GPRS) support node (SGSN), that an SGs association of a user equipment (UE) in an idle mode signaling reduction function (ISR) activated state is released,
in response to the determining step, sending, by the SGSN, a detach request message to the UE for initiating a combined registration procedure and sending, by the SGSN, a location update request to a mobile switch center/visitor location register (MSC/VLR).

2. The method according to claim 1, further comprising:
receiving, by the SGSN, a delete bearer request message from a serving gateway (S-GW);
wherein determining that the SGs association is released comprises:
determining, by the SGSN, that all bearer contexts of the UE are released and the UE in an ISR activated state has an evolved packet system mobility management (EMM) combined procedure capability.

3. The method according to claim 2, further comprising:
obtaining, by the SGSN from the UE, information that the UE has the EMM Combined Procedure capability when the UE initiates combined attach or routing area update on a GSM enhanced data rate for GSM evolution radio access network/evolved universal mobile telecommunications system territorial radio access network (GERAN/UTRAN).

4. The method according to claim 1, further comprising:
receiving, by the SGSN, a detach notification message from a mobility management entity (MME),
wherein determining that the SGs association is released comprises:
determining, by the SGSN, that the UE in an ISR activated state has an evolved packet system mobility management (EMM) combined procedure capability.

5. The method according to claim 4, wherein the detach notification message received from the MME further comprises: information indicating that the SGs association is released.

6. The method according to claim 1, wherein a type indication of the detach request message is international mobile subscriber identity detachment.

7. The method according to claim 1, wherein when the UE is in an idle state, and before sending the detach request message to the UE, the method further comprises:
sending, by the SGSN a paging message to the UE, to enable the UE to switch to a connected state, and to receive the detach request message sent by the SGSN.

8. A serving General Packet Radio Service (GPRS) support node (SGSN), comprising:
a processor, configured to determine that an SGs association of a user equipment (UE) in an idle mode signaling reduction function (ISR) activated state is released; and
a transmitter, configured to: when the processor determines that the SGs association is released, send a detach request message to the UE for initiating a combined registration procedure, and send a location update request to a mobile switch center/visitor location register (MSC/VLR).

9. The SGSN according to claim 8, wherein the SGSN further comprises a receiver, configured to:
receive a delete bearer request message from a serving gateway (S-GW).

10. The SGSN according to claim 9, wherein when the receiving unit receiver receives the delete bearer request message from the S-GW, the processor is configured to:
determine that all bearer contexts are released and the UE in an ISR activated state has an evolved packet system mobility management (EMM) combined procedure capability.

11. The SGSN according to claim 9, wherein the receiver is further configured to receive, from the UE, information of an EMM Combined Procedure capability when the UE initiates combined attach or routing area update on a GSM enhanced data rate for GSM evolution radio access network/evolved universal mobile telecommunications system territorial radio access network (GERAN/UTRAN).

12. The SGSN according to claim 8, wherein the SGSN further comprises a receiver, configured to:
receive a detach notification message from a mobility management entity (MME).

13. The SGSN according to claim 12, wherein when the receiver receives the detach notification message from the MME, the processor is configured to:
determine that the UE in an ISR activated state has an evolved packet system mobility management (EMM) combined procedure capability.

14. The SGSN according to claim 13, the detach notification message received from the MME further comprises: information indicating that the SGs association is released.

15. The SGSN according to claim 8, wherein a type indication of the detach request message is international mobile subscriber identity detachment.

16. The SGSN according to claim 8, wherein when the UE is in an idle state, and before the transmitter sends the detach request message to the UE, the transmitter is further configured to send a paging message to the UE, to enable the UE to switch to a connected state, and to receive the detach request message sent by the SGSN.

17. The SGSN according to claim 8, wherein the processor is further configured to:
determine that a serving gateway (S-GW) is restarted.

* * * * *